Figure 1:
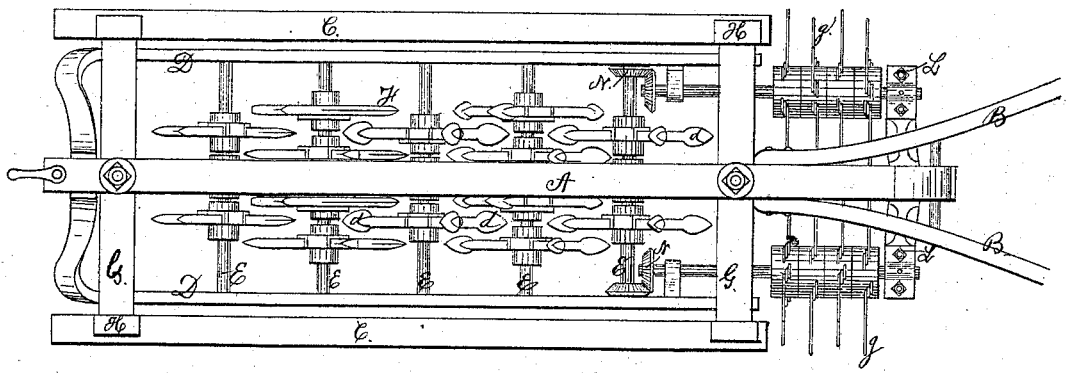

L. SONIAT.
Cane-Cultivators.

No. 147,992.  Patented Feb. 24, 1874.

WITNESSES.  Fig. 3.  INVENTOR.

UNITED STATES PATENT OFFICE.

LUCIEN SONIAT, OF JEFFERSON PARISH, LOUISIANA.

IMPROVEMENT IN CANE-CULTIVATORS.

Specification forming part of Letters Patent No. 147,992, dated February 24, 1874; application filed August 12, 1873.

*To all whom it may concern:*

Be it known that I, LUCIEN SONIAT, of the parish of Jefferson, in the State of Louisiana, have invented a new, useful, and Improved Cane-Cultivator; and I hereby declare the following to be a full, clear, and correct description of the same, reference being had to the accompanying illustrative drawing making part of this specification.

My improvement, which is simple and of easy construction, may be used for a variety of purposes for which a cultivator is generally employed upon a farm or plantation, such as the cultivation of corn, cotton, and other products; but it more especially relates to a class of cultivators required for the cultivation of sugar-cane. For this purpose it is employed in the early spring-time to loosen up and pulverize the earth which covers and surrounds what is technically known among the sugar-planters of Louisiana as the "stubble" of sugar-cane. This stubble consists of the stumps or short stalks which remain after the main stalks have been cut off and removed for sugar-making purposes. In the early spring-time this stubble is closely cut or shaven off by a cultivator known as a stalk-cutter or stubble-cutter, whereupon the earth which surrounds and covers the stubble, and which, during the winter season, has become solidly and firmly packed down by lapse of time and by trampling, has necessarily to be loosened up and pulverized, and the surplus earth removed from the stubble, so that the air and sun may have free access thereto, and thereby promote the growth of the young sprouts of the sugar-cane. My improvement accomplishes this object in a very thorough and efficient manner.

My improvement will now be more clearly understood by reference to the drawing, whereon the same is clearly shown, at—

Figure 2:
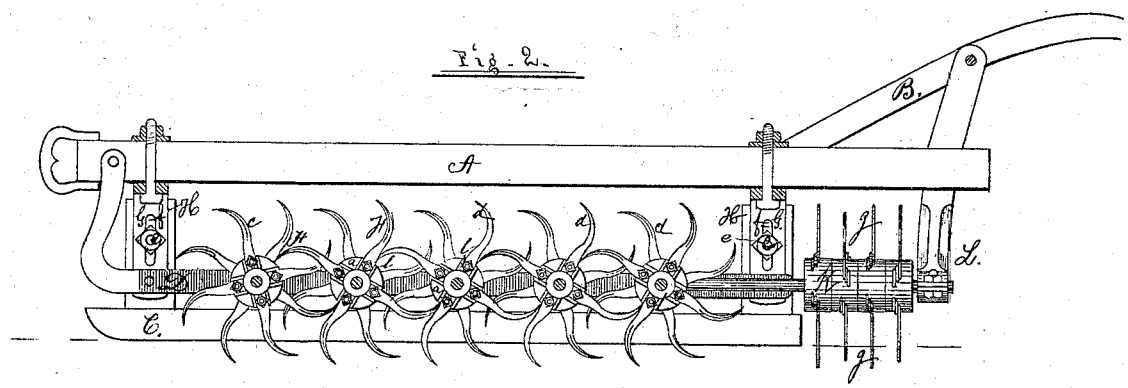

Figure 1, by a plan or top view, and at Fig. 2 by a side elevation. Fig. 3 shows a detail view.

Similar letters of reference indicate corresponding parts of the device.

A is a beam, to the forward end of which the draft-animals are attached, and B are the handles by which the operator guides the cultivator. C are ground-runners, upon which the whole device slides over the surface of the ground. D are longitudinal metal bars, upon which the five axles or shafts E have their bearing. To the shafts E are rigidly secured a series of cultivators, F. These cultivators are constructed with a metal hub, $a$, having each four or more lugs, $b$, to which the metal curved arms $c$ thereof are bolted, and the curved arms $c$ are terminated either with a sharp point or with a kind of plow-point, as plainly shown at $d$. The forward axle of my device is provided with a series of these cultivators, the next following with a series of four cultivators, the third one with a series of three, the fourth one with a series of four, and the last or fifth one with three cultivators. The cultivators have each an equal number of arms, and, consequently, an equal number of plow or sharp points. The shafts E all revolve in bearings resting upon or within the said longitudinal bars D. All the cultivators F are arranged upon their respective shafts in such manner that the following plow-points will not enter the ground exactly in the same place as those which next preceded them, whereby the entire surface of the ground over which my cultivator is made to pass becomes thoroughly loosened, plowed over, and pulverized. To the end that the longitudinal bars D, and consequently the shafts and cultivators therein placed, may be raised or lowered, as desired for the purpose, thereby regulating the depth at which it may be required the points of the cultivators shall enter the ground, the bars D are connected with the ends of the yokes G, the ends of which are turned down parallel with the upright standards H, and are secured thereto by means of the bolts or set-screws $e$, so that the yokes may be elevated or lowered, as desired, in the grooves $f$.

For the purpose of more effectually cleaning or combing out any earth or other substances which may exist to an injurious extent between the stalks or stubble of the cane after the cultivators F have passed over them, I have provided a second set of cultivators of a peculiar and novel construction, as will now be plainly described. These cultivators (shown at $g$) are constructed of flat spring-steel bars, one end of which, being coiled, is secured to the axle K, while their opposite ends work with elasticity over the stubble, so as not to injure the same, and at the same time they most effectually comb out the surplus earth or other substances which may surround the stubble to an injurious extent. The axles K, provided with the cultivators g, have, at one end, bearings in the ends of the yoke L, which is bolted to the beam A, while their opposite ends are provided with the bevel-pinions N, placed upon the rear axle or shaft E, whereby they receive rotary motion as the whole device moves forward over the surface of the ground to be cultivated. The forward ends of the axle K have bearings in journal-boxes bolted to the longitudinal bars D.

Having described my invention, what I claim as new is the following:

1. The longitudinal shafts K, having hubs provided with spring-teeth g, in combination with the branched hanger L, journal-boxes l, pinion-wheels N, and rotary shaft E', substantially as and for the purpose described.

2. The combination of the longitudinal toothed shafts K, pinion-wheels N, rotary cultivators E F, bars D, standards H, yokes G, and beam A, substantially as and for the purpose described.

LUCIEN SONIAT.

Witnesses:
J. C. HUBBELL,
H. N. JENKINS.